(12) United States Patent
Bove, Jr. et al.

(10) Patent No.: US 12,549,797 B2
(45) Date of Patent: Feb. 10, 2026

(54) METHODS AND SYSTEMS FOR PROVIDING MEDIA CONTENT

(71) Applicant: Adeia Guides Inc., San Jose, CA (US)

(72) Inventors: V. Michael Bove, Jr., Wrentham, MA (US); Serhad Doken, Bryn Mawr, PA (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 130 days.

(21) Appl. No.: 18/078,411

(22) Filed: Dec. 9, 2022

(65) Prior Publication Data

US 2024/0196038 A1    Jun. 13, 2024

(51) Int. Cl.
*H04N 21/414*   (2011.01)
*H04N 21/436*   (2011.01)

(52) U.S. Cl.
CPC . *H04N 21/41422* (2013.01); *H04N 21/41407* (2013.01); *H04N 21/436* (2013.01)

(58) Field of Classification Search
CPC ....... H04N 21/41422; H04N 21/41407; H04N 21/436
See application file for complete search history.

(56) References Cited

U.S. PATENT DOCUMENTS

| | | | |
|---|---|---|---|
| 9,481,326 B2 * | 11/2016 | Chatterjee | H04W 4/38 |
| 9,937,794 B2 | 4/2018 | Bellin et al. | |
| 2009/0168164 A1 * | 7/2009 | Kean | H04N 13/324 |
| | | | 359/464 |
| 2015/0031352 A1 * | 1/2015 | Yi | G01C 21/206 |
| | | | 455/420 |
| 2015/0127215 A1 * | 5/2015 | Chatterjee | B60H 1/00642 |
| | | | 701/1 |
| 2017/0185362 A1 | 6/2017 | Cansino et al. | |
| 2017/0221117 A1 | 8/2017 | Bollman | |
| 2018/0270542 A1 | 9/2018 | Ramalingam et al. | |
| 2019/0095227 A1 * | 3/2019 | Hwang | H04L 63/0861 |
| 2020/0242421 A1 | 7/2020 | Sobhany | |
| 2021/0055907 A1 * | 2/2021 | Bielby | G06F 3/165 |
| 2021/0365165 A1 * | 11/2021 | Chen | G06F 3/0488 |
| 2022/0294974 A1 * | 9/2022 | Gong | H04N 23/90 |
| 2023/0073442 A1 * | 3/2023 | Preiss | B60W 50/0205 |
| 2023/0161404 A1 * | 5/2023 | Chen | G06F 3/04847 |
| | | | 715/722 |
| 2024/0190289 A1 | 6/2024 | Bove et al. | |

(Continued)

FOREIGN PATENT DOCUMENTS

WO    WO-2023007844 A1 *    2/2023    ............ B60W 30/02

OTHER PUBLICATIONS

"How to use Netflix on your Tesla display," https://help.netflix.com/en/node/112323 retrieved Feb. 26, 2023.

(Continued)

*Primary Examiner* — Sunghyoun Park
(74) *Attorney, Agent, or Firm* — HG LAW LLP

(57) ABSTRACT

Systems and methods are described for determining an amount of time for charging a vehicle battery and selecting one or more media content items for display on a user device based on the amount of time for charging the vehicle battery. A level of driving autonomy of a vehicle is determined. An audio and/or video setting of the media content item is adjusted based on the level of driving autonomy.

20 Claims, 9 Drawing Sheets

(56) References Cited

U.S. PATENT DOCUMENTS

2024/0317304 A1* 9/2024 Oba ................ B60W 50/0097

OTHER PUBLICATIONS

"Tesla Adjusts Supercharging Cost to Include Vehicle Use While Charging," https://insideevs.com/news/392775/tesla-adjusts-supercharger-billing/ retrieved on Feb. 26, 2023.
Carr, "Tesla's Diner/Drive-In Theater for Superchargers Sounds Cool but Overdone," https://screenrant.com/tesla-diner-drivein-theater-supercharger-explained/ (2022) retrieved on Feb. 26, 2023.
Matyus, "HBO, Twitch, and other streaming apps may come to Tesla's dashboard," https://www.digitaltrends.com/news/more-video-streaming-services-could-come-to-teslas-in-car-entertainment/ (2019) retrieved on Feb. 26, 2023.

* cited by examiner

METHODS AND SYSTEMS FOR PROVIDING MEDIA CONTENT

BACKGROUND

The present disclosure relates to methods and systems for providing media content. Particularly, but not exclusively, the present disclosure relates to determining an amount of time for charging a vehicle battery and providing one or more media content items for display while the vehicle battery is charging. The present disclosure also relates to adjusting a setting relating to the display of a media content item based on an autonomous driving level of a vehicle.

SUMMARY

In most cases, electric vehicle (EV) charging is done at home. However, it is often necessary to recharge a vehicle at a public charging station. Whether charging an EV at home or at a public charging station, charging time depends on various factors, such as a starting level of charge, a required level of charge, the capacity of the EV battery and the power rating of the charger (e.g., slow, fast, rapid, etc.). As such, the overall charging time can vary each time the EV is charged, and charging time can still take 15-40 minutes even when using an ultra-rapid charging point. Thus, it is desirable to fill a user's time while the EV is charging. In some cases, media content may be provided for consumption while the vehicle is charging. However, since the charging time can vary between charge events, selection of appropriate content can be difficult.

Moreover, during and/or following a charge event, or otherwise, media content may be consumed on a user device in a vehicle. For example, it is becoming increasingly common to view content on a screen in the instrument panel of the vehicle and/or on a mobile device of an occupant of the vehicle. In some cases, depending on legislation, it may be allowable to watch content in a vehicle when the vehicle is in an autonomous driving mode, but not when in a manual driving mode. Furthermore, it may be allowable for a passenger to watch content, but not a driver. As such, it is desirable to provide media content for display in a safe manner.

Systems and methods are provided herein for improving how a user consumes media content, e.g., by providing to a user media content having an appropriate duration for a determined charging time. For example, a total charging time may comprise a time for charging a vehicle battery and a time for waiting for and/or travelling to an available charging point. As such, one or more media content items may be provided having a viewing time corresponding with the total charging time. The systems and methods provided herein may also improve the consumption of media content in a vehicle, e.g., as the vehicle transitions between different autonomous driving modes. For example, a driver may be allowed to view media content when a vehicle operates at one, higher, level of autonomous driving, but not at another, lower, level of autonomous driving. As such, display of a media content item to a driver is managed according to a current level of autonomous driving.

According to some examples, methods and systems disclosed herein determine an amount of time for charging a vehicle battery. One or more media content items are selected, e.g., identified, for display on a user device based on the amount of time for charging the vehicle battery. For example, one or more media content items may be identified as appropriate for display to a user based on the duration of the one or more media content items and the time for charging the vehicle battery.

In some examples, a set of the one or more selected, e.g., identified, media content items is presented to a user, e.g., by virtue of a list of titles or a collection of tiles each representing an identified media content item. In some examples, each entry in the list or the collection of tiles is user-selectable to allow a user to instruct playback of the one or more media content items.

In some examples, the one or more media content items are generated for display while the vehicle battery is charging. For example, the one or more media content items may be generated for display on a user device of the vehicle, such as a user device forming part of an instrument panel of the vehicle, a mobile user device, which may be inside a vehicle, and/or home user device, such as a TV.

In some examples, a level of driving autonomy of a vehicle is determined. In some examples, an audio and/or video setting of the media content item may be adjusted based on the level of driving autonomy In some examples, a determination is made as to whether the vehicle battery has reached a predetermined state of charge (SOC), e.g., an SOC required to complete a journey, while displaying the one or more media content items. An operational mode of the vehicle may be determined in response to the vehicle battery reaching the predetermined state of charge. In some examples, a setting for the display of the one or more media content items may be changed based on the operational mode of the vehicle. For example, a display setting may relate to a screen direction, a video and/or audio display setting, a display power setting, and a setting that determines on which screen(s) the media content item is displayed.

In some examples, a media content item having an audio component, e.g., an audio only component, relating to the one or more displayed media content items is requested based on the operational mode of the vehicle. The audio component may be generated for playback while the vehicle is moving, e.g., in response to changing the display setting.

In some examples, the one or more media content items are selected for display based on multiple user profiles of people associated with the vehicle, such as people in the vehicle, or in a nearby vehicle.

In some examples, determining the amount of time for charging the vehicle battery comprises determining a waiting time before charging can be initiated. In some examples, determining the amount of time for charging the vehicle battery comprises determining an amount of time for the vehicle battery to achieve a predetermined SOC, e.g., an SOC required to a complete journey.

In some examples, the amount of time for charging the vehicle battery is based on a current state of charge of the vehicle battery and a state of charge required to complete an upcoming journey, accounting for various factors, such as traffic, weather, waypoints, etc.

In some examples, the amenities provided at a charging station are determined. In some examples, the one or more media content items are selected for display on the user device based on the determined amenities.

In some examples, an operational mode of a vehicle accessory device, such as a heater or air-conditioning unit, is determined, while the vehicle battery is being charged. In some examples, the selection of the one or more media content items for display is updated based on the operational mode of a vehicle accessory device. For example, the operation of a vehicle accessory drive may extend the charging time. As such, one or more additional media content items may be selected based on the extended charging time.

In some examples, the occupancy of the vehicle may be determined while the vehicle battery is being charged. The selection of the one or more media content items may be updated based on the occupancy of the vehicle.

In some examples, the one or more media content items are generated for display while the vehicle battery is charging. In some examples, a playback speed of the one or more media content items is modified based on the amount of time for charging a vehicle battery. For example, a playback speed may be (slightly) increased or decreased to as to adjust the total runtime of the one or more media content items.

Systems and methods are provided herein for improving how a user consumes media content, e.g., by adjusting a setting relating to the display of a media content item in a vehicle while the vehicle is moving. The systems and methods provided herein determine a level of driving autonomy of a vehicle and determine whether a media content item is being consumed in the vehicle. A setting relating to the display of the media content item, e.g., an audio and/or video setting, is adjusted based on the level of driving autonomy.

In some examples, an amount of time for charging a vehicle battery is determined. In some examples, one or more media content items are selected for display on a user device based on the amount of time for charging the vehicle battery. The media content item may be generated for display during and/or after the charging of the vehicle battery.

In some examples, a location of the vehicle is determined. The level of driving autonomy of the vehicle may be a level implemented at the location.

In some examples, a threshold level of driving autonomy of the vehicle is determined. A determination may be made as to whether the level of driving autonomy of the vehicle is below the threshold level. The setting relating to the display of the media content item may be adjusted in response to the level of driving autonomy of the vehicle being below the threshold level. The setting relating to the display of the media content item may be maintained in response to the level of driving autonomy of the vehicle being at or above the threshold level.

In some examples, determining the threshold level of driving autonomy of the vehicle comprises determining an environmental condition at the location. In some examples, determining the threshold level of driving autonomy of the vehicle comprises determining a cognitive load of a driver of the vehicle.

In some examples, a determination is made as to whether the media content item is viewable by a driver of the vehicle. The setting relating to the display of the media content item may be adjusted in response to the media content item being viewable by a driver of the vehicle. The setting relating to the display of the media content item may be maintained in response to the media content item not being viewable by a driver of the vehicle.

In some examples, adjusting the setting relating to the display of the media content item comprises reorientating a screen of the vehicle. In some examples, adjusting the setting relating to the display of the media content item comprises transferring display of the media content item from a screen of the vehicle to a screen of a mobile device. In some examples, adjusting the setting relating to the display of the media content item comprises requesting a media content item having an audio component relating to the media content item based on the level of driving autonomy of the vehicle, and generating for audio playback the audio component to a driver of the vehicle.

In some examples, the media content item may be displayed on a multiple view directional display configured to display multiple images with each image being visible in a specific direction. In such a case, adjusting the setting relating to the display of the media content item comprises adjusting an input to the multiple view directional display to change the display of at least one of the multiple images.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
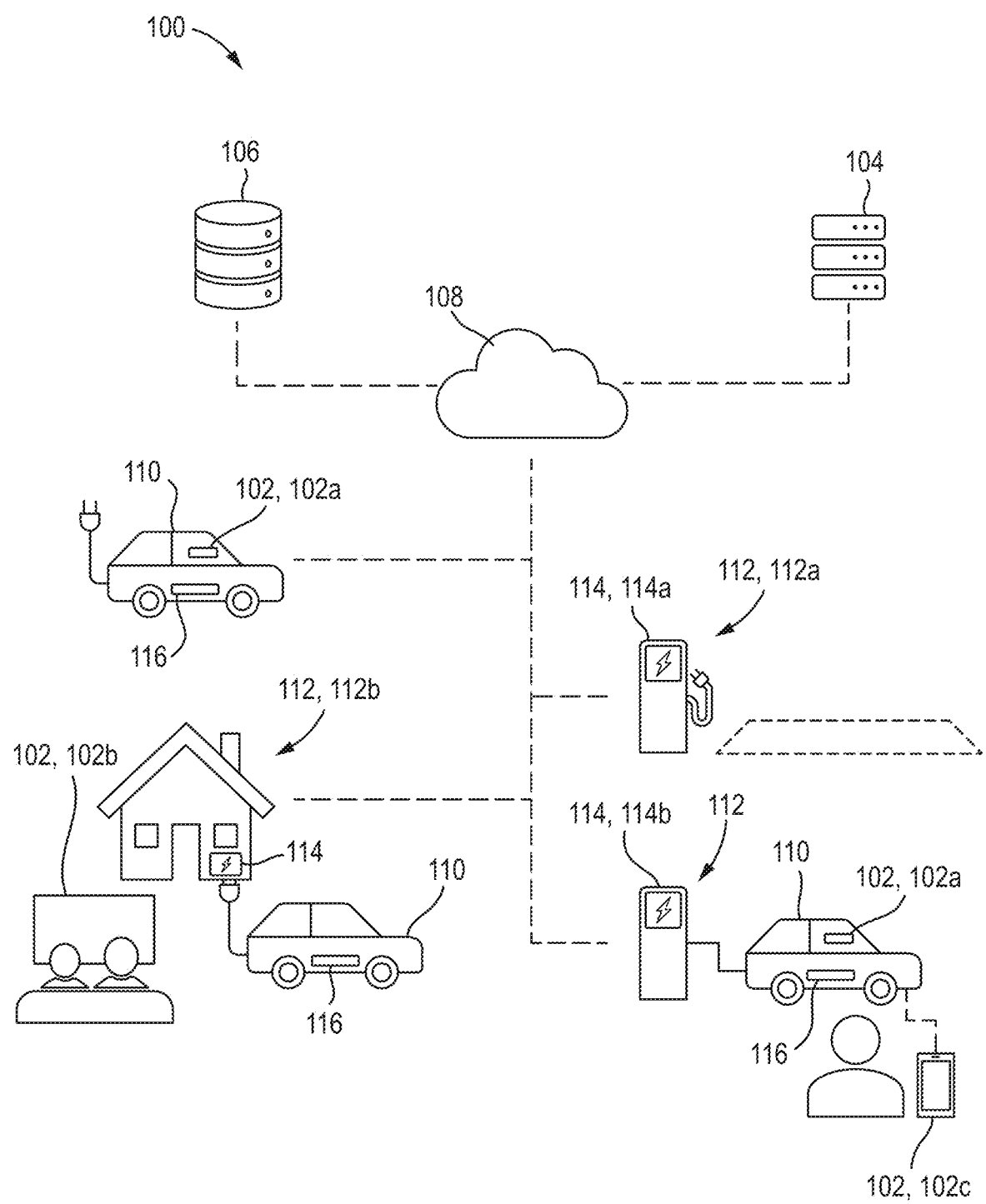
FIG. 1 illustrates an overview of the system for providing media content, in accordance with some examples of the disclosure.

FIG. 1 illustrates an overview of a system 100 for providing media content, e.g., to a user device 102. In particular, the example shown in FIG. 1 illustrates that media content can be provided to one or more types of user device 102. For example, user device 102*a* may be a vehicle user device, e.g., a user device having a display screen forming part of an instrument panel of a vehicle, user device 102*b* may be a home user device, such as a TV, and user device 102*c* may be a mobile device of a user, such as a smart phone or tablet. Each user device 102 is communicatively coupled to a server 104 and a content item database 106, e.g., via network 108. In this manner, the user device 102 may access media content provided by a content provider operating server 104.

In the example shown in FIG. 1, system 100 comprises one or more vehicles 110, such as a battery electric vehicle, a plugin hybrid electric vehicle, and/or any other appropriate vehicle having a chargeable battery. For example, vehicle 110 may be a passenger EV, a commercial vehicle, such as a bus or truck, a construction vehicle, such as a crane, a motor bike, a marine vessel, or an aircraft, etc. For the avoidance of doubt, the present disclosure relates to charging a traction battery of an EV and/or the charging of one or more auxiliary batteries of a vehicle. For example, a vehicle according to the present disclosure may be an electric pickup truck having a traction battery and one or more additional batteries for powering a peripheral device of the vehicle, such as a winch. As such, the term "charging of a vehicle battery" or "vehicle battery charging" may relate to the charging of a traction battery of a vehicle and/or the charging of an additional/auxiliary battery of a vehicle.

System 100 includes one or more charging stations 112. For example, charging station 112 may be a facility having the ability to charge a vehicle battery. In the example shown in FIG. 1, charging station 112a is a public charging station having one or more charging points 114, such as a 350 kW ultra-rapid charger, and charging station 112b is a home of a user having a charging point 114, such as a 7.4 kW home charging point. In some examples, a charging station 112, or at least a charging point of a charging station 114, and a vehicle may communicate by means of peer-to-peer communication.

System 100 also includes network 108 such as the Internet, configured to communicatively couple user device 102 and charging point 114 to one or more servers 104 and/or one or more content databases 106 from which content, such as navigational data, route data and/or other media content, such as emails, webinars, lectures, etc. may be obtained. Additionally or alternatively, media content may comprise a video call, e.g., between users at different locations. User device 102 and the one or more servers 104 may be communicatively coupled to one another by way of network 108, and the one or more servers 104 may be communicatively coupled to content database 106 by way of one or more communication paths, such as a proprietary communication path and/or network 108. In this manner, data may be exchanged between user device 102 and charging point 114, e.g., to select and provide media content for display on user device 102, e.g., while a vehicle battery is charging, and/or otherwise.

Figure 2:
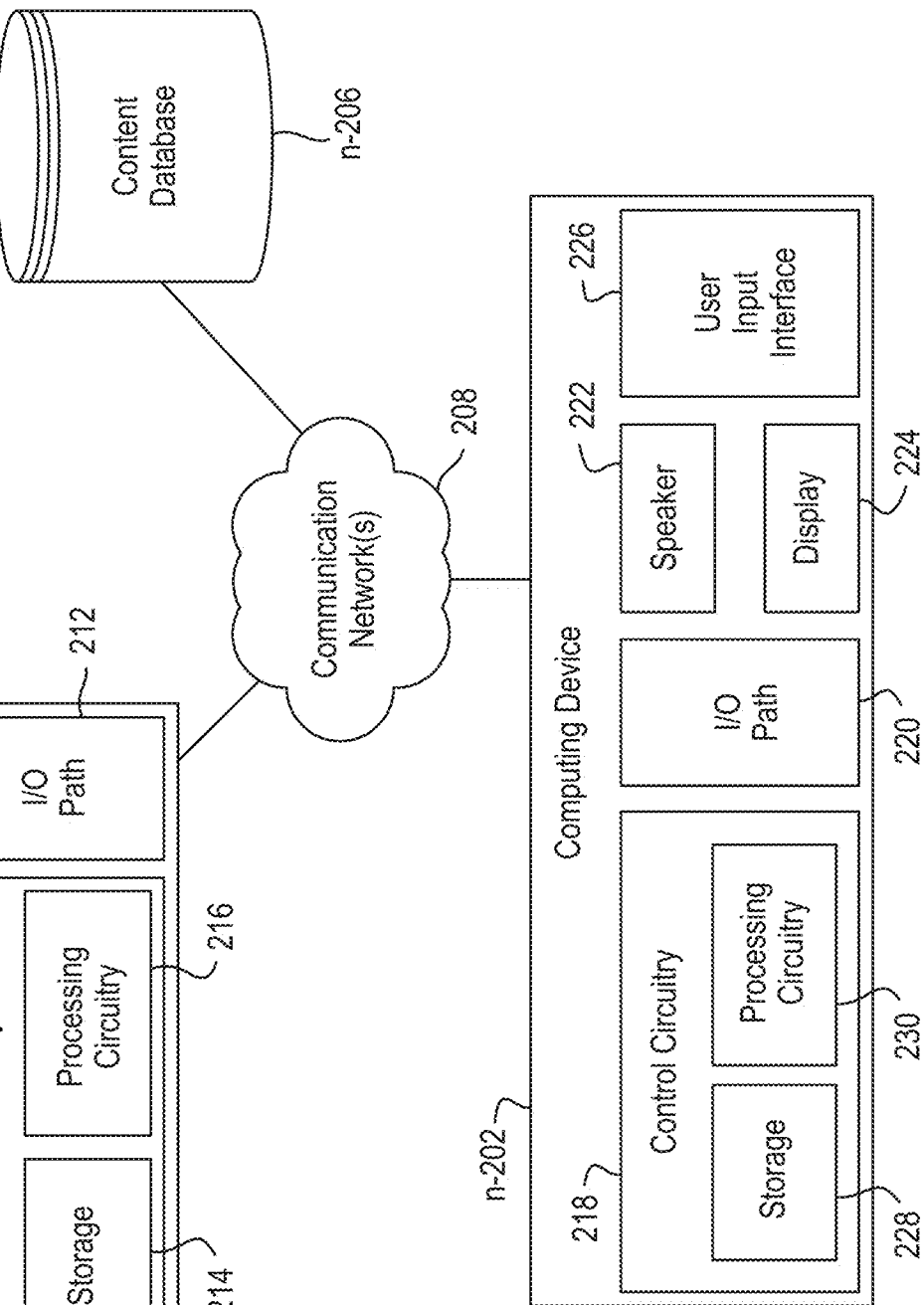
FIG. 2 is a block diagram showing components of an example system for providing media content, in accordance with some examples of the disclosure.

FIG. 2 is an illustrative block diagram showing example system 200, e.g., a non-transitory computer-readable medium, configured to provide media content. Although FIG. 2 shows system 200 as including a number and configuration of individual components, in some examples, any number of the components of system 200 may be combined and/or integrated as one device, e.g., as user device 102 and/or as part of a vehicle. System 200 includes computing device n-202, server n-204 and one or more content databases n-206 (denoting any appropriate number of computing devices, such as user device 102, servers, such as server 104, and content databases, such as content database 106), each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device n-202. For example, computing device n-202 may implement some or all of the functionality of server 104. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be a HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or used instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to select media content and provide it for display, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
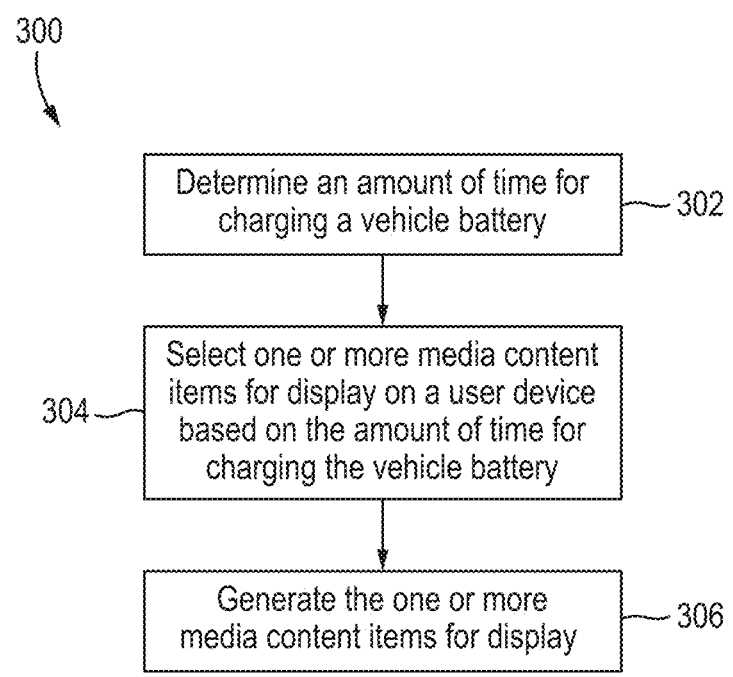
FIG. 3 is a flowchart representing a process for providing media content, in accordance with some examples of the disclosure.
Figure 4:
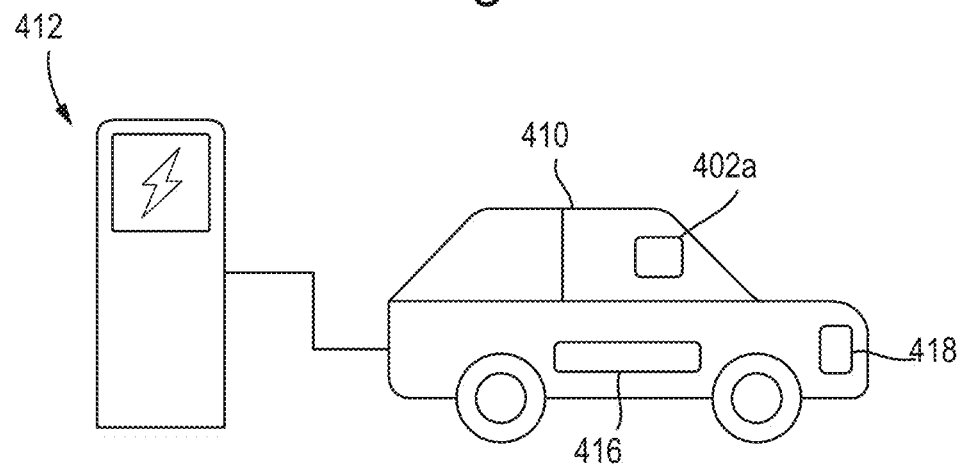
FIG. 4 illustrate a vehicle connected to a charging point, in accordance with some examples of the disclosure.
Figure 5:
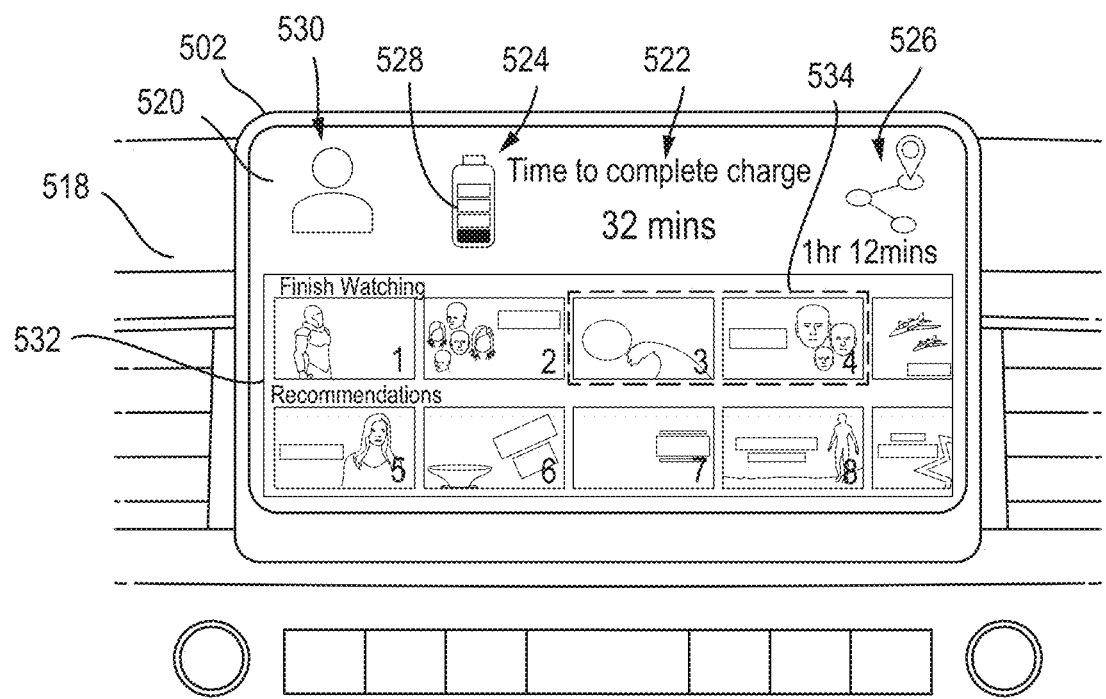
FIG. 5 illustrates a display screen in a vehicle instrument panel, in accordance with some examples of the disclosure.

FIG. 3 shows a flowchart representing an illustrative process 300 for providing media content, e.g., while charging a vehicle battery. FIG. 4 illustrates a vehicle at a charging point. FIG. 5 illustrates a display screen in the instrument panel of the vehicle shown in FIG. 4. While the example shown in FIGS. 3 to 5 refers to the use of system 100, as shown in FIG. 1, it will be appreciated that the illustrative process shown in FIGS. 3 to 5, may be implemented on system 100 and system 200, either alone or in combination with each other, and/or any other appropriately configured system architecture.

At 302, control circuitry determines an amount of time for charging a vehicle battery 116, 416. For example, control circuitry of vehicle 110, 410 may communicate with control circuitry of charge station 112, e.g., via server 104, to determine an amount of time, e.g., 16 minutes, to charge vehicle battery 116 from a current state of charge (SOC), e.g., 25%, to a target SOC, e.g., 80%, based on a power rating, e.g., 150 KW, of charging point 114.

At 304, control circuitry selects, e.g., identifies, one or more media content items for display on user device 102 based on the determined amount of time to charge vehicle battery 116, 416. For example, control circuitry of server 104 may access media content metadata and select one or more media content items having a total duration of (or approximately of) 35 minutes. In this manner, one or more media content items are selected such that the total viewing time of the selected media content items corresponds with the amount of time that a user will be waiting while the vehicle battery 116, 416 is charging. For the avoidance of doubt, selection or identification of the one or more media content items does not refer to the playback of the media content items. For example, following selection or identification of one or more that have a runtime matching the amount of time for charging the battery, a set of selected or identified media content item titles may be presented to a user, e.g., by virtue of a list of titles or collection of tiles representing respective media content items, on user device 102*a*, 402*a*, so that a user can browse the selected/identified media content items. In some examples, playback of one or more of the media content items can be requested in response to a user instruction. Alternatively, playback of one or more of the selected media content items may happen automatically, e.g., at 306.

At 306, control circuitry generates the one or more media content items for display on user device 102, e.g., upon user selection of one or more of the identified titles. For example, when charging station 112, 412 is a public charging station, control circuitry, e.g., of server 104, may cause one or more media content items to be streamed to (or otherwise accessed by) user device 102*a*, 402*a*, so that a user can view the media content while waiting at charging station 112, 412 for vehicle 116 to reach the target SOC, e.g., while the user waits in vehicle 116, 416. Additionally or alternatively, control circuitry, e.g., of server 104, may cause one or more media content items to be streamed to (or otherwise accessed by) user device 102*c*, so that a user can view the media content while waiting at charging station 112, 412 for vehicle battery 116, 416 to reach the target SOC, e.g., while the user waits in vehicle 110, 410 and/or moves between vehicle 110, 410 and amenities, such as cafes and shops, provided at charging station 112, 412. In a similar manner, when charging station 112 is a home charging station 112*b*, server 104 may cause one or more media content items to be streamed to (or otherwise accessed by) user device 102*b*, so that a user can view the media content while waiting at home for vehicle 116 to reach the target SOC. The actions or descriptions of FIG. 3 may be done in any suitable alternative orders or in parallel to further the purposes of this disclosure.

In the context of the present disclosure, the terms "media content" and "media content item" is understood to mean any appropriate type of content that may be generated (as text, images, video and/or audio) for user consumption. For example, media content may include, without limitation, TV programs, movies, games, one or more levels of a game, adverts, music, live broadcast events, webinars, educational/training material, emails, telephone calls, video conferences, or any combination thereof. Thus, where control circuitry determines that a user has a certain amount of time to wait while their vehicle is charging, one or more types of media content can be selected for presentation to the user so as to fill that amount of time. For example, when a user has 35 minutes to wait for battery 116 to reach a predetermined SOC, e.g., a target SOC, control circuitry may select a TV program of duration 27 minutes and one or more commercials having a duration of 8 minutes, which are inserted into the TV program. In some cases, control circuitry may schedule a video conference of duration 30 minutes with one or more other individuals, leaving 5 minutes for the user to fill as they please. In some cases, e.g., where the vehicle is a commercial vehicle, control circuitry may provide an appropriate portion of training material for the user to complete while the user waits. In some cases, control circuitry may access a user's email account and select one or more emails for the user to read while they wait. For example, control circuitry may parse one or more emails to determine an approximate length and reading time of each email, and provide the one or more emails having a reading time of (approximately) 35 mins to the user for consumption while they wait. In some examples, The example shown in FIG. 5 illustrates an instrument panel 518 of a vehicle, e.g., vehicle 116 or 416. The instrument panel 518 has a user device 502 having a display screen 520. User device 502 may be integrated into instrument panel 518 or may be dockable in a port of instrument panel 518. As such, user device 502 may share control circuitry with the vehicle, e.g., to determine an operational state of user device 502 and/or the vehicle. Alternatively, user device 502 may be a standalone device in operational communication with a controller of the vehicle, e.g., to share information regarding an operational state of user device 502 and/or the vehicle. In the example shown in FIG. 5, control circuitry has determined that the amount of time is 32 mins (see display element 522) to complete a target SOC (see display element 524), which relates to an onward journey (see display element 526). For the avoidance of doubt, the target SOC is not necessary a full SOC. For example, display element 524 indicates that the time to complete the charge relates to a time to increase the SOC by a sufficient amount for the vehicle to be able to complete the onward journey (see charge status indicators 528 of display element 524). However, in other examples, the target SOC may be any predetermine SOC, such as a full SOC, or any other appropriate SOC determined by a battery control module of the vehicle. Based on the determined time, control circuitry has identified multiple media content items for a user to view while waiting. In this example, the identified multiple media content items relate to User 1 (see display element 530), who may be the driver of the vehicle. Alternatively, User 1 may be another occupant of the vehicle. Selection/identification of media content items based on vehicle occupancy is discussed in more detail below in relation to FIG. 6.

In the example shown in FIG. 5, the identified media content items are presented as a collection of tiles 532, each tile (e.g., tiles 1-8) representing an identified media content item. The collection of selected of media content items comprises a selection of TV shows and movies that User 1 has partially consumed (see top row of media content items labelled "Finish Watching"). As such, control circuitry has selected these media content items since the amount of time to charge the vehicle battery corresponds to a time taken for a user to complete watching one or more of the partially-consumed media content items. In some examples, control circuitry may be configured to group media content items for back-to-back viewing, e.g., based on a total amount of time taken to view the remaining portions of respective multiple media content items. For example, control circuitry may group media content items (see dashed line 534) such that, upon user selection, multiple media content items, e.g., media content items represented by tiles 3 and 4, are generated for playback in a single command. The selection of media content items comprises a selection of TV shows and movies that are recommended for User 1 based on viewing history and/or other information in a user profile (see bottom row of media content items labelled "Recommendations"). The recommended media content items may each have a duration corresponding to the charging time, or may be grouped in a similar manner to that described above. For example, a recommended group of media content items may comprise multiple short episodes of a series having a total playback time corresponding to the charging time.

Figure 6:
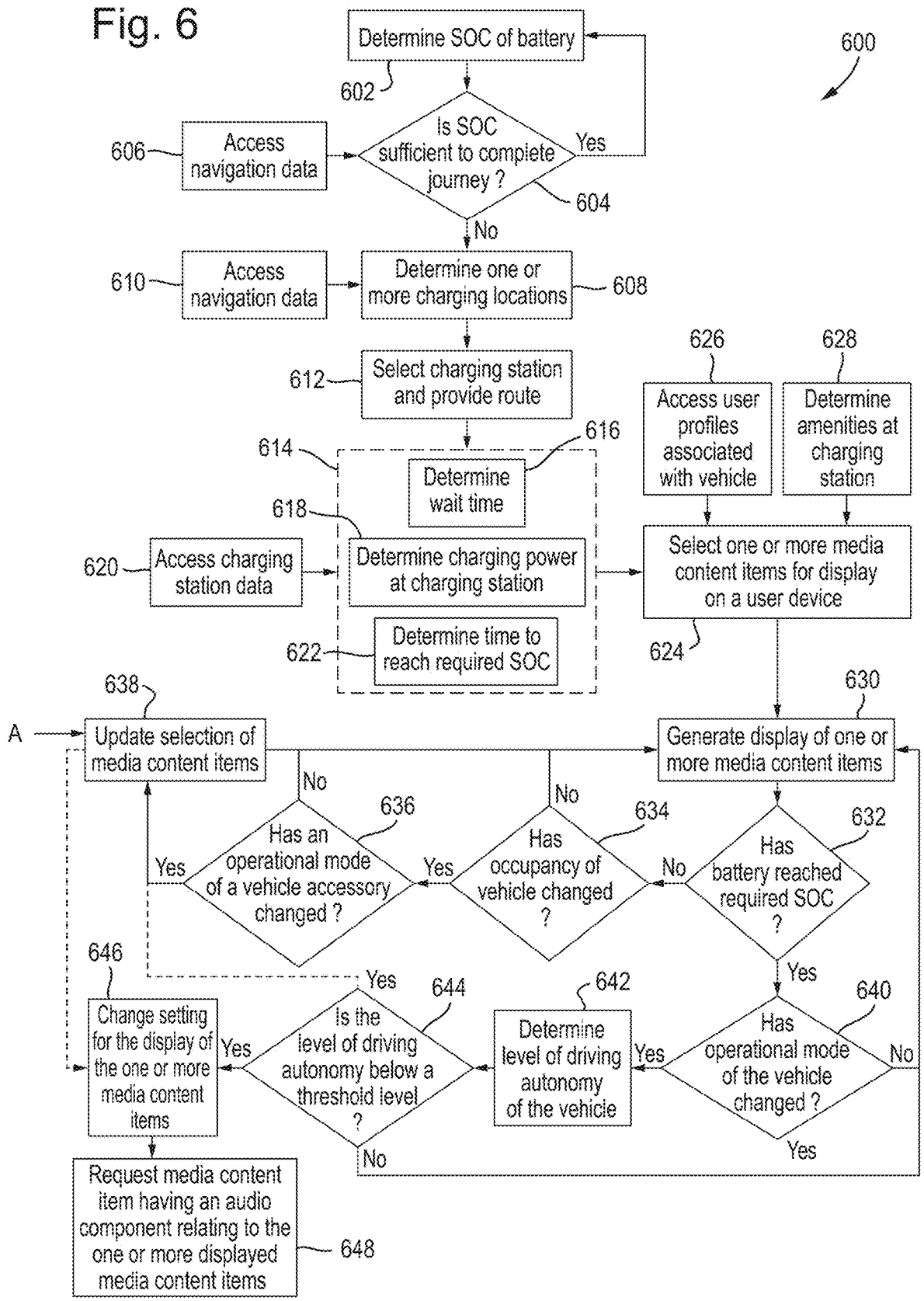
FIG. 6 is a flowchart representing a process for generating display of one or more media content items, in accordance with some examples of the disclosure.

FIG. 6 shows a flowchart representing an illustrative process 600 for generating display of one or more media content items, e.g., for consumption while an EV is charging. While the example shown in FIG. 6 refers to the use of system 100, as shown in FIG. 1, it will be appreciated that the illustrative process shown in FIG. 6, may be implemented on system 100 and system 200, either alone or in combination with each other, and/or any other appropriately configured system architecture.

At 602, control circuitry, e.g., control circuitry of vehicle 116, determines a SOC of a battery of the vehicle 116. For example, a battery control module of vehicle 116 may determine the current SOC of battery 116. Battery SOC data may be stored in storage 214, 218 and/or and any other appropriate storage module, such a storage module of vehicle control circuitry.

At 604, control circuitry, e.g., control circuitry of vehicle 116, determines whether the current SOC of battery 116 is sufficient to complete a current journey and/or an upcoming journey. For example, a navigational control module of vehicle 116 may access navigational data at 606 and determine an amount of charge required for vehicle 116 to complete the journey indicated in display element 526, e.g., based on traffic and/or weather conditions. Control circuitry, e.g., of vehicle 116 and/or server 104, can then determine a target SOC based on the current SOC and the amount of charge needed to complete the journey. When control circuitry determines that there is sufficient SOC to complete the journey, process 600 returns to 602. When control circuitry determines that there is not sufficient SOC to complete the journey, process 600 moves to 604.

At 608, control circuitry, accesses navigational data, at 610, to determine the location of one or more charging stations 112. For example, control circuitry of vehicle 110 and/or server 104 may access navigational data and compare the location of vehicle 110 to the location of one or more charging stations 112 to determine whether the current SOC of vehicle battery 116 is sufficient to allow vehicle 110 to reach the charging station 112.

At 612, control circuitry, e.g., vehicle control circuitry, selects a charging station 112 that is reachable and provides a route to that charging station 112. For example, vehicle control circuitry may automatically select a preferred charging station 112 from multiple reachable charging station 112, e.g., based on a user preference stored in a user profile. Alternatively, vehicle control circuitry may generate a user-selectable list from which a user can pick a preferred charging station 112, and, upon selection, a route to the charging station 112 may be provided.

At 614, control circuitry determines an amount of time for charging vehicle battery 116. e.g., in a manner similar to that described under 302 above. In the example shown in FIG. 6, 614 comprises 616, 618 and 622.

At 618, control circuitry, e.g., control circuitry of charging station 112, determines a wait time for accessing a charging point 114 at the charging station 112. For example, depending on the number of other vehicles wanting to use the charging station 112, there may be one or more other vehicles waiting to access the charging point 114. In the example shown in FIG. 1, charging point 114a is vacant, and, as such, does not currently have a wait time for accessing it. However, charging point 114b is occupied, and, as such, there is currently a wait time for accessing it. Where a charging point is occupied, the wait time may be determined by the amount of time remaining to charge the vehicle 110 occupying the charge point 114b, and by the amount of time for one or more other vehicles to use the charge point 114b. In some examples, one or more wait times for respective charging points 114 can be shared by the charging station 112 with server 104, so that a vehicle 110 on route to a charging station 112 may determine a wait time for accessing a charging point 114. In some examples, control circuitry may be configured to schedule access to a charging point 114. For example, where a charging station 112 has been selected and a route established to that charging station 112, vehicle control circuitry can estimate a time of arrival at that charging station 112 and schedule access to a charging point accordingly. Thus, a wait time for accessing a charge point may account for a portion of the total amount of time for charging vehicle battery 116. In this manner, a wait time can be determined (e.g., estimated), so that one or more media content items of appropriate duration can be provided to a user when waiting to access a charging point.

At 618, control circuitry, e.g., control circuitry of server 104 and/or vehicle 110, determines a power rating for charging point 114 at the selected charging station 112, e.g., by accessing charging station data at 620. For example, control circuitry of charging station 112 may share data indicating the power rating of respective charging points 114 at the charging station 112. Following the above example, vehicle control circuitry, upon selection of a charging station 112, may request data from charging station 112 and/or server 104 relating to the power rating of a charging point 114, e.g., a charging point 114 that is scheduled for access upon arrival at the charging station 112.

At 622, control circuitry, e.g., control circuitry of server 104 and/or vehicle 110, determines a time for vehicle battery 116 to reach the target SOC. For example, the vehicle control circuitry may determine a charge time of 35 mins to reach the target SOC (e.g., as described under 302 above), based on the determined power rating, the current SOC and the target SOC. Other factors may be considered, such as ambient temperature and/or any other environmental factor that may influence charging time.

Thus, at 614, control circuitry determines a total charging time based on wait time determined at 616 and the time for the vehicle battery 116 to reach the target SOC determined at 622.

At 624, control circuitry, e.g., control circuitry of server 104, selects one or more media content items, e.g., for displaying on user device 102. The one or more media content items are selected so that a total runtime of the media content items corresponds to the total charging time. In the example shown in FIG. 6, the selection is based on additional criteria, such as those described in relation to 626 and 628.

At 626, control circuitry accesses a user profile of one or more users associated with vehicle 110. For example, where vehicle 110 has only a single occupant, e.g., a driver, selection of the media content items may be made based on that user's profile. In other examples, the vehicle may have multiple occupants, such as a driver and at least one passenger, and the selection of the media content items may be made based on one of the occupant's user profiles. For example, control circuitry may be configured to receive an input indicating on which user's profile to base the selection of the one or more media content items. In the example shown in FIG. 5, the selection is based on the profile of user 1, e.g., a driver or a passenger (see display icon 530). In other examples, the selection of the media content items may be based on a combination of user profiles. For example, where vehicle 110 is occupied by an adult and a child, the selection may be based on both the preferences of the adult and the child, e.g., to exclude from recommendation adult themed content. Alternatively, vehicle 110 may be occupied by multiple adults or children, and the selection of the media content items may be based on common preferences between the adults or children. In some examples, the selection of media content items may be based on a profile of a first user associated with vehicle 110, e.g., an occupant of vehicle 110, and a profile of another user associated with the vehicle, such as a user in a nearby vehicle. For example, two (or more) users may be charging their EVs at adjacent charging points 114. A first user may have started charging their EV first and be watching a media content item, such as a live broadcast sports event. A second user, positioned at a nearby or adjacent charging point, may have a common interest in the sports event. As such, the sports event is selected for displaying to the second user.

At 628, control circuitry determines one or more amenities provided at the charging station 112. For example, an amenity may be a store, a café, a playground, a Wi-Fi, cellular and/or satellite access point, etc. In some examples, control circuitry accesses a database of information associated with a selected charging station 112, e.g., as vehicle 110 is travelling to the selected charging station 112. In this manner, the amenities at the selected charging station 112 may be determined in advance of vehicle 110 starting to be charged. In some cases, one or more of the selected media content item may relate to an amenity at the charging station 112. For example, where the charging station 112 has a particular chain of fast food restaurants, an advert for that chain may be selected for display during the charge time. More specifically, a advert may be selected for display during a wait time ahead of the vehicle 110 being charged. In some examples, the charging station 112 and/or one or more amenities provided at charging station 112, such as a fast-food chain, may offer promotional access to a content provider (e.g., that is not subscribed to by an occupant of vehicle 110). For example, the charging station 112 or an amenity may provide access to one or more media content items which can be distributed directly to a vehicle via a Wi-Fi network of the charging station 112. In this manner, at least a portion of the selected one or more media content item may comprise promotional material offered for consumption on a user device 102, e.g., in exchange for using the charging station 112 or using one or more of the amenities provided at the charging station 112.

Returning to 624, as discussed above, the selection of the one or more media content items is made so as to match, as far as practical, the total run time of the media content items to the total charge time. However, it may be difficult to match accurately the run time of the media content items to the total charge time. For example, the total charge time may be 35 minutes, and the total runtime (or remaining runtime) of the one or more selected media content item may be slightly more than or less than the total charge time. In such cases, control circuitry may modify at least one of the runtime of the one or more media content items and the total charge time. For example, control circuitry may cause the content of the one or more media content items to be speeded up or otherwise shortened, e.g., by cutting one or more portions of the media content item, so as to reduce the runtime of the one or more media content items to more closely match the total charge time. Additionally or alternatively, the total charge time may be modified, e.g., increased or decreased, to more closely match the runtime of the one or more selected media content items.

At 630, control circuitry, e.g., control circuitry of vehicle 110 and/or user device 102, generates display of the one or more selected media content items, e.g., while the vehicle 110 is waiting to be charged and during the charging of vehicle battery 116. As discussed above, the one or more media content items can be displayed on any appropriate user device 102, such as a vehicle screen and/or on a mobile device. In some examples, a first media content item may be selected for display to a first occupant of vehicle 110, e.g., using a vehicle screen 102a, and a second media content item may be selected for display to a second occupant of the vehicle 110, e.g., using a mobile device 102c. In this manner, the first occupant can view the first media content item and the second occupant can view the second media content item, both occupant's viewing being managed so as to time the consumption of the respective media content items with the total charging time.

At 632, control circuitry, e.g., control circuitry of vehicle 110 and/or charging station 112, determines whether vehicle battery 116 has reached the target SOC. When the vehicle battery 116 has not reached the target SOC, process 600 moves to 634, and the vehicle battery 116 continues to charge. When the vehicle battery 116 has reached the target SOC, process 600 moves to 640.

At 634, control circuitry, e.g., control circuitry of vehicle 110, determines whether the occupancy of the vehicle 110 has changed. For example, after determining an appropriate selection of media content items that matches the total charge time, one or more occupants of the vehicle 110 may leave the vehicle 110, e.g., to use an amenity at the charging station 112. As such, the amount of time for viewing the media content items may be reduced than the total charging time, e.g., by virtue of the one or more occupants not being present in the vehicle 110 during the charging time. For example, control circuitry may determine that the total charge time is 35 mins, at 614, and select media content items accordingly. Once charging of the vehicle battery 116 starts, an occupant may leave the vehicle for 10 mins to get a coffee. As such, the amount of time remaining to view the media content item when the occupant returns to the vehicle 110 is reduced and the runtime of the selected media content items may no longer match the time available for viewing. In response to determining that the occupancy of the vehicle 110 has changed, 634 moves to 636. However, in other examples, 636 may move directly to 638. For example, in response to determining that the occupancy of the vehicle 110 has changed, and a duration for which one or more occupants were away from vehicle 110, control circuitry may update the selected media content items. For example, control circuitry may remove a media content item from the selected media content items since it has a runtime longer than the available time to view media content while the vehicle battery 116 is charging. Additionally or alternatively, control circuitry may select one or more other media content items having a shorter runtime than the charging time determined at 614. In the example shown in FIG. 6, 634 moves back to 630 when control circuitry determines that there is no change in vehicle occupancy. In some examples, when control circuitry determines a change in the occupancy of the vehicle 110, display of the one or more media content items may be transferred from user device 102a, e.g., a vehicle display unit, to user device 102c, e.g., a smartphone. In such an example, control circuitry may continue to generate the display of the one or more media content items on a user's smartphone, e.g., as that user moves away from the vehicle 110. When one or more occupants remain in the vehicle 110, control circuitry may continue to generate the display of the one or more media content items on a vehicle display unit. In such an example, process 600 may effectively return to 630, e.g., by transferring the display of the one or more media content items to user device 102c and ceasing the display of the one or more media content items on user device 102a, or by transferring the display of the one or more media content items to user device 102c and maintaining the display of the one or more media content items on user device 102a. However, a change in occupancy may affect the common interests of occupants in the vehicle 110. For example, as discussed above, selection of the one or more media content items at 624 is influenced by the user profiles accessed at 626. As such, if one occupant (e.g., User 1 shown in display element 530) leaves the vehicle 110, the selection of the one or more media content items may be updated, e.g., at 638, based on the profile(s) of the occupant(s) remaining in the vehicle 110.

At 636, control circuitry, e.g., control circuitry of vehicle 110, determines whether an operational mode of a vehicle accessory (e.g., see vehicle accessory 418 on FIG. 4) has changed, e.g., while the vehicle battery 116 is charging. In the context of the present disclosure, a vehicle accessory may be any appropriate type of vehicle device that may affect the SOC of the vehicle battery 116. For example, a vehicle accessory may be an air conditioning compressor, a heater element, a light, and/or any other appropriate component of a vehicle. Additionally or alternatively, vehicle accessory may be any appropriate type of device operationally associated with the vehicle 110 and that may affect the SOC of the vehicle battery 116, such as peripheral device electrically connected to a powernet of the vehicle 110. For example, a peripheral device may be a battery-powered tool or other device, such as a smartphone, connected to a vehicle powernet, e.g., for powering and/or charging the peripheral device. At 636, when control circuitry determines that an operational mode of a vehicle accessory changed, a new charging time may be determined, e.g., to account for an additional and/or different electrical load on the powernet of the vehicle 110. When there is no change in the operational mode of a vehicle accessory, and thus no change in electrical load of the powernet of the vehicle 110, process 600 moves back to 630. When there is a change in the operational mode of a vehicle accessory, and thus a change in electrical load of the powernet of the vehicle 110 and the charging time to reach the target SOC, process 600 moves to 638, where the selection of the one or more media content items is updated. For example, where the charging time has increased, one or more additional media content items may be selected for display, e.g., one or more commercials or other short media content, to supplement the media content items selected at 624. In this manner, the total runtime of the selected media content items may be adjusted to more closely match the total charging time.

Returning to 632, when control circuitry determines that the target SOC has been reached, process 600 moves to 640, where control circuitry, e.g., control circuitry of vehicle 110, determines whether an operational mode of the vehicle 110 has changed. For example, an operational mode may be a driving mode or a parked mode. In the context of the present disclosure, a change in driving mode may indicate whether the vehicle has finished charging and has continued along a planned route, such as that displayed at 526 in FIG. 5. When control circuitry determines that an operational mode of the vehicle 110 has not changed, process 600 returns back to 630, and continues to display the one or more media content items. In this manner, the occupant(s) of the vehicle 110 can continue to watch content, e.g., until a decision is made to move from the charging point 114. When control circuitry determines a change in the operational mode of the vehicle 110, process 600 moves to 642.

At 642, control circuitry, e.g., control circuitry of vehicle 110, determines a level of driving autonomy of the vehicle 110. For example, control circuitry may determine which of the six levels of driving autonomy (e.g., as defined by SAE J3016) is currently implemented in the operation of the vehicle 110, e.g., as required by a location of the vehicle 110. In some examples, a charging station may require vehicle 110 to be operated at a certain level of driving autonomy, e.g., a high level of driving autonomy (such as level 5), while the vehicle 110 is at the charging station 112, or at least while at the charging point 114, which may be a fully autonomous charging point. Whereas, when vehicle 110 leaves charging station 112, or the vicinity of charging point 114, a lower level of driving autotomy may be permitted, e.g., as vehicle 110 returns to a public road/highway. In some examples, determining a level of driving autonomy may include determining a level of cognitive load of a driver of vehicle 110, such as determining a level of driver distraction, e.g., caused by one or more actions occurring in the vehicle 110, such as a conversation with another occupant, and/or one or more actions occurring outside of the vehicle, e.g., in relation to a level of traffic and/or weather conditions.

At 644, control circuitry, e.g., control circuitry of vehicle 110 and/or server 104, determines whether the level of driving autonomy of the vehicle 110 is below a threshold level of driving autonomy. For example, the threshold level of driving autonomy may be set to Level 4, which requires performance by an automated driving system of all aspects of the dynamic driving task. In such a cases, when control circuitry determines that the level of driving autonomy is Level 4 or above, process 600 returns to 630 and control circuitry may continue to generate one or more of the media content items for display, e.g., as permitted by local regulations regarding what actions may be permitted at various levels of driving autonomy. Alternatively, when control circuitry determines that the level of driving autonomy is below Level 4, process 600 moves to 646 (e.g., directly or via 638 shown by dashed arrows). In other words, upon completing a charging event, one or more occupants of the vehicle 110, other than the driver, may wish to continue watching media content while vehicle 110 continues on the journey. As such, the selection of media content items may be updated, e.g., based on the remaining journey time. For example, once the vehicle battery 116 as reached the target SOC, control circuitry may determine an estimated time of arrival at a destination, and thus the duration of the remaining journey. In such a case, control circuitry may update the selection of media content items to provide one or more media content items having a runtime matching the remaining journey time.

At 646, control circuitry, e.g., control circuitry of vehicle 110, causes a setting for the display of the one or more media assets to be changed. For example, when operation of the vehicle 110 requires some level of human performance, e.g., in relation to operating a steering wheel, a pedal, and/or another vehicle system, control circuitry may cause the display of media content items to be permitted, e.g., permitted only, on a user device 102 not visible by the driver of vehicle 110. For example, control circuitry may cause a screen visible by a driver, e.g., by virtue of its position and orientation in the vehicle, to become no longer visible by the driver. Such action my be effected by moving and/or re-orientating the screen, or by causing the one output of a multiple view display that is visible by the driver to be switched to an alternate mode. In this manner, the driver is prevented from continuing with the viewing of media content, while one or more other occupants may continue with viewing the media content.

At 648, control circuitry, e.g., control circuitry of vehicle 110, requests a media content item having an audio component, e.g., having only an audio component, relating to the one or more displayed media content items. For example, where a driver has been watching a sports broadcast while the vehicle battery 116 was charging, process 600 may prevent the driver from continuing to watch an analysis of the sports event. However, control circuitry may request an audio feed relating to the sports broadcast, e.g., to allow the driver to at least listen to the analysis of the sporting event while continuing on the journey. In some examples, consumption of a media content item may be switched from a video mode, such as that generated at 630, to an audio-only mode, e.g., by requesting only audio segments for a media content item currently being displayed, upon detecting a change in the operational mode of the vehicle, such as a drive command being received or the vehicle is no longer in a park-mode. In some examples, control circuitry may be configured to perform logic that switches the display of media content items at 630, e.g., when the vehicle 110 is in charge-mode, park mode, or otherwise operating at a certain level of driving autonomy, to streaming only requested audio segments, e.g., when the vehicle is in drive-mode, or otherwise operating at a lower level of driving autonomy. In some examples, control circuitry may also cause the display of the media content items to automatically switch to a picture-in-picture mode, or transfer the display of the media content items to a screen that is not visible by the driver of the vehicle 110.

The actions or descriptions of FIG. 6 may be done in any suitable alternative orders or in parallel to further the purposes of this disclosure.

Figure 7:
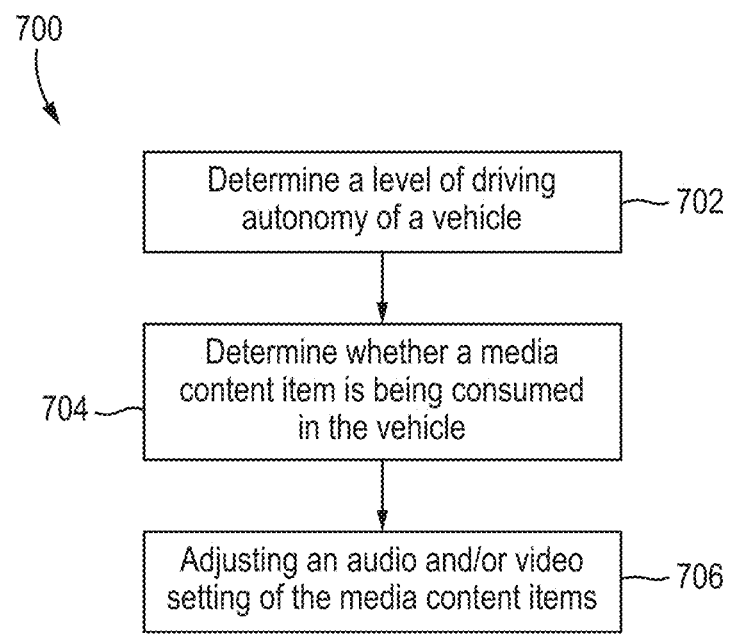
FIG. 7 is a flow chart representing a process for providing media content, in accordance with some examples of the disclosure.

FIG. 7 shows a flowchart representing an illustrative process 700 for adjusting an audio setting and/or display setting of one or more media content items depending on a level of autonomous driving of a vehicle. While the example shown in FIG. 7 refers to the use of system 100, as shown in FIG. 1, it will be appreciated that the illustrative process shown in FIG. 7, may be implemented on system 100 and system 200, either alone or in combination with each other, and/or any other appropriately configured system architecture.

At 702, control circuitry, e.g., control circuitry of vehicle 116, determines a level of driving autonomy of vehicle 110, e.g., in a manner similar to that described at 642 above. For example, control circuitry may determine a required level of driving autonomy, e.g., based on the location and/or manner of operation of the vehicle. In some examples, a geofenced region, such as a charging station 112, a portion of a highway, a zone in a city, or a zone on a construction site, may require vehicle 110 to initiate a certain level of driving autonomy, e.g., to comply with local regulations. In some examples, control circuitry may determine that a change in level of driving autonomy is allowed or required, e.g., as vehicle 110 moves into or out of a geofenced area. For example, control circuitry may determine that a lower level of driving autonomy is permitted as vehicle leaves charging station 112, e.g., as vehicle 110 leaves a region around a charging point 114 and joins a public highway. In other examples, a higher level of autonomy may be required, e.g., a vehicle enters a particular region of a city, such as a pedestrianized region or a parking lot.

At 704, control circuitry, e.g., control circuitry of vehicle 116, determines whether a media content item is being consumed in the vehicle 110. For example, vehicle control circuitry may determine that a user device 102 is operating in vehicle 110 and that a media content item is being displayed on the user device 102, such that the media content item is visible to one or more occupants in the vehicle 110. In addition, control circuitry may determine that user device 102a is visible by a driver of vehicle 110, e.g., by virtue of one or more sensors, such as a seat occupancy sensor of the vehicle 110 and/or one or more optical tracking methods, such as gaze tracking.

At 706, control circuitry, e.g., control circuitry of vehicle 116 and/or server 104, causes an audio and/or video setting relating to the playback of the media content item to be adjusted based on the level of driving autonomy. For example, as discussed above, control circuitry may cause a media content item to be restricted from being viewed by a driver of vehicle 110 when the level of required driving autonomy falls below a threshold value. In other examples, a media content item may be generated for display, e.g., in response to determining an increase in the required level of autonomy. For example, where vehicle 110 is a construction vehicle, one or more media content items, such as a safety warning, may be generated for display to a driver as the constriction vehicle moves into a geofenced zone on a construction site that requires a higher level of required driving autonomy.

The actions or descriptions of FIG. 7 may be done in any suitable alternative orders or in parallel to further the purposes of this disclosure.

Figure 8:
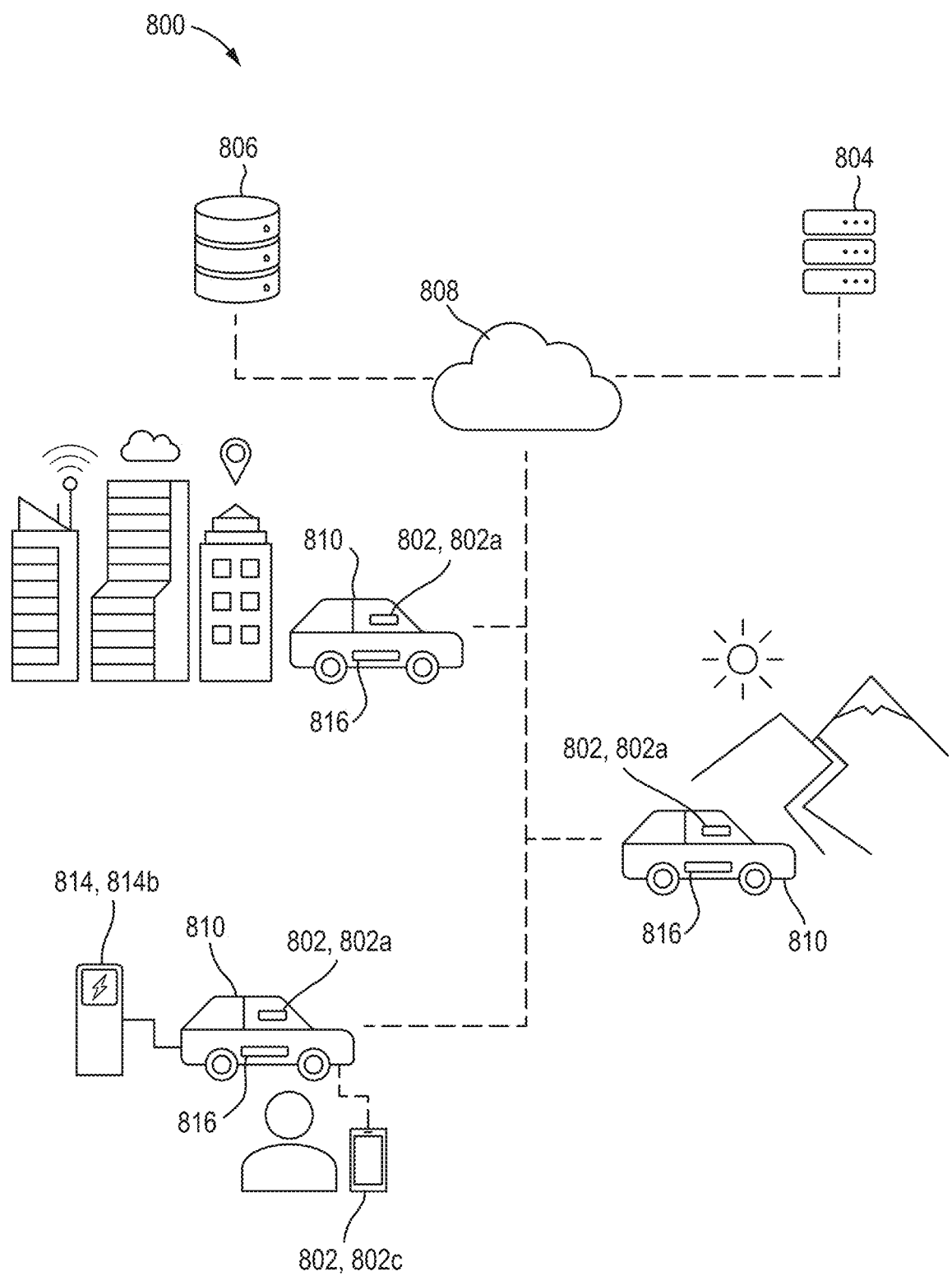
FIG. 8 is illustrates an overview of a system for providing media content, in accordance with some examples of the disclosure.
Figure 9:
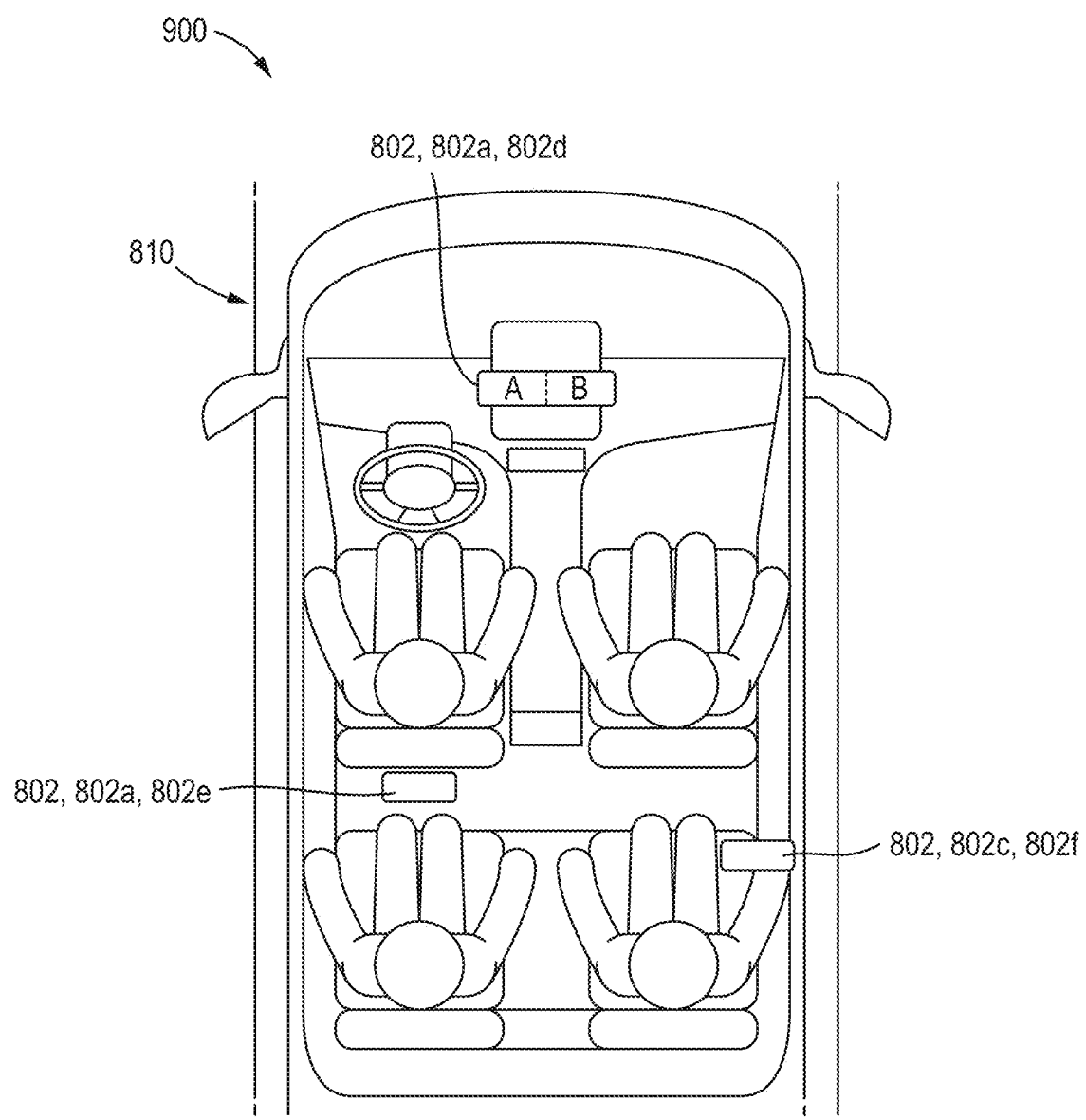
FIG. 9 illustrates an interior layout of a vehicle shown in FIG. 8, in accordance with some examples of the disclosure.
Figure 10:
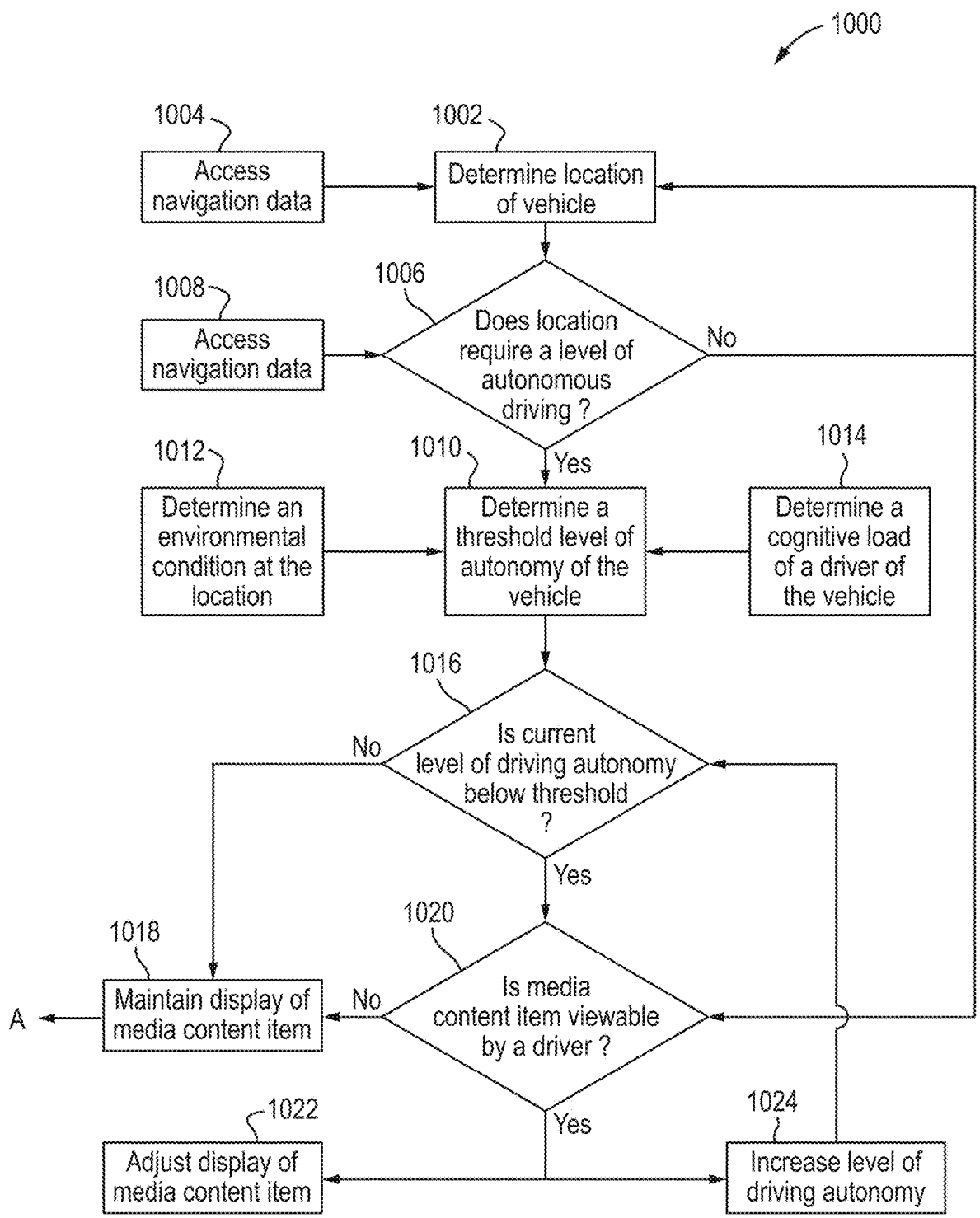
FIG. 10 is a flow chart representing a process for providing media content, in accordance with some examples of the disclosure.

FIG. 8 illustrates an overview of a system 800 for providing media content, e.g., by adjusting an audio and/or video setting for the display of media content on a user device 802. FIG. 9 illustrates an interior layout of a vehicle shown in FIG. 8. FIG. 10 shows a flowchart representing an illustrative process 1000 for adjusting an audio setting and/or display setting of one or more media content items depending on a level of autonomous driving of a vehicle. While the example shown in FIG. 10 refers to the use of system 800 and vehicle 910, as shown in FIGS. 8 and 9 respectively, it will be appreciated that the illustrative process shown in FIG. 10, may be implemented on system 100 and system 200, either alone or in combination with each other, and/or any other appropriately configured system architecture, such as that shown in FIGS. 8 and 9.

In the example shown in FIG. 8, system 800 comprises one or more vehicles 810, such as a battery electric vehicle, a plugin hybrid electric vehicle, and/or any other appropriate vehicle having a chargeable battery. For example, vehicle 810 may be a passenger EV, a commercial vehicle, such as a bus or truck, a construction vehicle, such as a fork lift truck, a motor bike, a marine vessel, or an aircraft, etc. FIG. 8 illustrates that media content can be provided to one or more types of user device 802. For example, user device 802a may be a vehicle user device, e.g., a user device having a display screen forming part of an instrument panel or other part of a vehicle, and user device 802c may be a mobile device of a user, such as a smart phone or tablet. Each user device 802 is communicatively coupled to a server 804 and a content item database 806, e.g., via network 808. In this manner, the user device 802 may access media content provided by a content provider operating server 804, e.g., in a manner similar to that described above in relation to system 100 and/or 200.

System 800 also includes network 808 such as the Internet, configured to communicatively couple user device 802 and vehicle 810 to one or more servers 804 and/or one or more content databases 806 from which content, such as navigational data, route data and/or other media content, such as emails, webinars, lectures, etc. may be obtained. Additionally or alternatively, media content may comprise a video call, e.g., between user at different locations. User device 802 and the one or more servers 804 may be communicatively coupled to one another by way of network 808, and the one or more servers 804 may be communicatively coupled to content database 806 by way of one or more communication paths, such as a proprietary communication path and/or network 808. In this manner, data may be exchanged between user device 802, vehicle 810 and server 804, e.g., to select and provide media content for display on user device 102, e.g., while a vehicle battery is charging, and/or otherwise. In particular, data may be exchanged to determine a location of vehicle 810, e.g., relative to one or more other locations. For example, system may be configured to determine the location of vehicle 810 relative to one or more geofenced zones, e.g., a zone of a city, a charging station, and/or any other appropriate zone able to be geofenced for controlling vehicle operation. In some examples, server 804 may store data relating to one or more vehicle operating conditions or operational states, e.g., based on vehicle position relative to a geofenced zone. For example, server 804 may store information relating to a level, e.g., a minimum or maximum level, of autonomous driving that is permitted or required in a particular geofenced zone or at a particular location. For example, FIG. 8 illustrates charging station 812 and a city zone 832, each of which may require at least partial autonomous operation of vehicle 810, e.g., as moves through the city zone 832 and the charging station 812, or as it charges/waits to be charged. As such, system 800 may be configured to select and provide media content for display on user device 802 (e.g., in a manner similar to that described for process 300 and/or process 600), and adjust one or more audio and/or video settings relating to the display of the media content on user device 802.

FIG. 9 illustrates a seating layout of vehicle 810 having multiple user devices 802a integrated or otherwise operationally coupled, e.g., physically and/or electrically, to vehicle 810 and forming part of system 800. Vehicle 810 also contains a separate user device 802c, such as a user's smart phone, that is communicatively coupled to vehicle 810, or otherwise forming part of system 800. As such, system 800 provides for the adjustment of one or more audio and/or video settings relating to the display of the media content on user device 802a and/or 802c, e.g., based on an operational parameter of vehicle 810, such as a level, e.g., a current level or future level, of driving autonomy of vehicle 810, a location of vehicle 810, and/or a SOC of a battery of vehicle 810.

Referring to FIG. 10, at 1002, control circuitry, e.g., control circuitry of vehicle 810, determines a location, e.g., a current location or a future location, of vehicle 810. For example, control circuitry may access, at 1004, navigational data from a navigational module of vehicle 810. In the example shown in FIG. 8, the location of vehicle 810 may be a city location 834, a rural location 836 or at a more specific location, like charging station 812.

At 1006, control circuitry, e.g., control circuitry of vehicle 810 and/or server 804, determines whether a level of autonomous driving is required (or allowed) at the location of vehicle 810. For example, the navigational module of vehicle 810 may share the location of the vehicle 810 with server 804. Control circuitry of server 804 may access autonomous driving data, at 1008, and determine whether one or more local rules or regulations require vehicle 810 to operate at an autonomous driving level, e.g., at one of autonomous driving levels 0-6 (as defined by SAE J3016). For example, control circuitry may access city data to determine whether vehicle 810 is required to operate at an autonomous driving level as it travels through geofenced city zone 832. In some examples, control circuitry may access charging station data to determine whether vehicle 810 is required to operate at an autonomous driving level as it uses charging station 812, or is within geofenced zone 838 of charging station 812. In some examples, vehicle 810 may be in a rural location 836, or another location, e.g., a part of a city, not having any autonomous driving regulations. When control circuitry determines that a level of autonomous driving is required, process 1000 moves to 1010. When control circuitry determines that a level of autonomous driving is not required, process 1000 moves to 1020.

At 1010, control circuitry, e.g., control circuitry of vehicle 810 and/or server 804, determines a threshold level of autonomous driving required at the location at which vehicle 810 is (or will be). For example, city data may provide instructions for vehicle 810 to operate at or above autonomous driving level 4 when vehicle 810 is within city zone 832, or charging station data may provide instructions for vehicle 810 to operate at or above autonomous driving level 5 when vehicle 810 is within zone 838 of charging station 812, e.g., as vehicle 810 is using charging point 814. In the example shown in FIG. 10, the threshold level of autonomous driving is based on an environmental condition at the location and/or a cognitive load of the driver of vehicle 810, e.g., in addition to or instead of being based on location data (such as city data or charging station data).

At 1012, control circuitry, e.g., control circuitry of vehicle 810 and/or server 804, determines an environmental condition of or at the location determined in 1002. For example, control circuitry may determine that it is (or will be) snowing at the location. In some examples, control circuitry may determine a current or future condition of a road surface, e.g., whether the road surface is wet. In some examples, control circuitry may determine current or future traffic conditions at the location. Control circuitry may use the determined environmental conditions to confirm whether the threshold level is suitable. For example, where weather conditions are bad and/or traffic is heavy, control circuitry may increase the threshold level to account for the poor driving conditions. Alternatively, control circuitry may determine that the threshold level is set too high, e.g., where one or more autonomous driving systems may have reduced functionality in the determined environmental conditions, e.g., where the sun is very low in the sky, or where there is white out. As such, the threshold level of driving autonomy may be reduced to necessitate at least partial manual control of vehicle 810.

At 1014, control circuitry, e.g., control circuitry of vehicle 810, determines a cognitive load of the driver of vehicle 810. For example, control circuitry may determine, e.g., using vehicle sensors, a level of distraction of the driver. For example, control circuitry may determine that the driver is involved in a conversation with another occupant of vehicle 810, and/or using a hands-free telephone. Additionally or alternatively, control circuitry may determine that a driver has a high level of cognitive load, e.g., by virtue of traffic conditions (e.g., a high level of traffic) and/or by a number, e.g., a frequency, of inputs made to the controls of vehicle 810. Additionally or alternatively, control circuitry may determine that a cognitive load of a driver is high based on one or more driving conditions, such as the condition of a road in wet or snowy weather, or if visibility is low, such as at night in poor lighting conditions. In some examples, control circuitry may monitor the cognitive load of a driver to determine when the cognitive load has increased. As such, the threshold level of driving autonomy may be increased to necessitate at least partial autonomous control of vehicle 810 to account for an increased cognitive load.

At 1016, control circuitry, e.g., control circuitry of vehicle 810, determines whether the current level of driving autonomy is below the threshold level of driving autonomy. For example, control circuitry may determine that the vehicle 810 is operating at a first level of driving autonomy, e.g., level 4, and that the threshold level has been set to a second level, e.g., level 4. In such a case, process 1000 moves to 1018. Alternatively, control circuitry may determine that the vehicle 810 is operating at a first level of driving autonomy, e.g., level 4, and that the threshold level has been set to a second level, e.g., level 5. In such a case, process 1000 moves to 1020.

At 1018, control circuitry, e.g., control circuitry of vehicle 810, maintains the display of a media content item that is being displayed in vehicle 810, e.g., in response to the current level of driving autonomy being at or above the threshold level. For example, with reference to FIG. 9, control circuitry may continue to generate the display of one or more media content items currently being shown on user devices 802a and 802c. In other words, since control circuitry determines that vehicle 810 is operating at or above a certain (required) level of driving autonomy, there is no need to modify the display of media content in the vehicle 810. In such a case, a driver may continue to view a media content item on a screen in vehicle 810. For example, where vehicle 810 is at charging station 812 and is viewing media content while vehicle 810 is charging, should a required level of autonomous driving be implemented as vehicle 810 leaves charging station 812, the display of the media content may be continued, so that the driver's viewing is not interrupted. In some examples, 1018 of process 1000 may feed into 638 of process 600 (see arrow A), e.g., to update the selection of media content items in response to the driver continuing to view media content (or a longer duration of viewing time being available), by virtue of vehicle 810 operating at a required level of driving autonomy.

At 1020, control circuitry, e.g., control circuitry of vehicle 810, determines whether a media content item is viewable by a driver of the vehicle. For example, with reference to FIG. 9, control circuitry may determine that user devices 802d, 802e and 802f are each displaying a media content item. However, as a result of the position of user device 802d, the driver of vehicle is able to view media content generated for display on its screen. In some examples, control circuitry may determine whether media content item is viewable by a driver of the vehicle based on the relative positions of a driver's seat and a user device 802 in vehicle 810. Additionally or alternatively, control circuitry may determine a gaze of a driver, e.g., using one or more vehicle sensors, to determine, or at least help determine whether a media content item is viewable by a driver of the vehicle 810. When a media content item is not viewable by the driver, such as where the media content item is displayed only on user device 802*e* and/or 802*f*, process 1000 moves to 1018, as described above. When a media content item is viewable by the driver, such as where the media content item is displayed on user device 802*d*, process 1000 moves to 1022 and 1024.

At 1022, control circuitry, e.g., control circuitry of vehicle 810, causes the display of media content to be adjusted, e.g., such that the media content is no longer viewable by the driver. For example, control circuitry may cause one or more display settings of user device 802*e* to be changed. This may include: changing the position, e.g., the orientation, of the user device 802*d* so that its screen can no longer be seen by the driver; adjusting a power setting of user device 802*d*, e.g., turning off the user device 802*e*; changing an input to the display of user device 802*e*, e.g., to display a navigational display; and/or transferring the display from user device 802*d* to another user device 802, e.g., user device 802*e* and/or 802*f*. In some examples, user device 802*d* may be a multiple-view directional display configured to display multiple images with each image being visible in a specific direction. For example, user device 802*e* may be configured to display, simultaneously (e.g., in a multiplexed manner), image A, which is viewable only by a driver of vehicle 802, and image B, which is not viewable by the driver of the vehicle 802. In such an example, control circuitry may cause image A to be discontinued from being displayed, so that the driver can no longer view image A in response to the output from 1016. In this manner, the display of media content items for consumption by the driver is restricted when the vehicle 810 is operating at an autonomous driving level that is below a required level. In some examples, in response to restricting the driver from viewing the display of the media content, control circuitry may cause the media content that the driver was viewing to be stored, e.g., so that the driver may continue to view the media content at a later time. Additionally or alternatively, control circuitry may resume the display of the media content when the level of driving autonomy increases to be at or above the threshold level.

At 1024, control circuitry, e.g., control circuitry of vehicle 810, increases the level of driving autonomy of the vehicle 802. For example, control circuitry may increase the level of driving autonomy that would allow the driver to view media content. In some cases, a default setting for operating vehicle 802 may be to automatically adjust the level of driving autonomy to permit, e.g., always maintain, the display of media content for consumption by the driver. In other cases, control circuitry may request a user input to authorize an increase in the level of driving autonomy, so as to maintain the media content in a state viewable by the driver. In the example shown in FIG. 10, 1024 feeds backs to 1016, e.g., to incrementally increase the level of driving autonomy until it is at the threshold level.

The actions or descriptions of FIG. 10 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    determining if a vehicle is operating in an autonomous driving mode associated with a level of driving autonomy of the vehicle;
    based at least in part on determining that the vehicle is operating in the autonomous driving mode, monitoring, using one or more sensors of the vehicle, a level of distraction associated with a driver of the vehicle;
    based at least in part on monitoring the level of distraction associated with the driver of the vehicle, determining, using control circuitry, a cognitive load of the driver of the vehicle, wherein the cognitive load of the driver of the vehicle is based at least in part on a plurality of environmental conditions requiring either a higher or a lower level of attention of the driver of the vehicle;
    detecting an increase in the cognitive load of the driver of the vehicle;
    based at least in part on detecting the increase in the cognitive load of the driver of the vehicle, determining a higher level of driving autonomy of the vehicle; and
    based at least in part on determining the higher level of driving autonomy of the vehicle:
        determining, using the control circuitry, whether a media content item is being consumed in the vehicle; and
        automatically adjusting, using the control circuitry, an audio and/or video setting of the media content item based at least in part on the increase in the cognitive load of the driver of the vehicle.

2. The method according to claim 1, further comprising: determining a location of the vehicle, wherein
    the level of driving autonomy of the vehicle is a level implemented at the location.

3. The method according to claim 1, further comprising:
    determining the level of driving autonomy of the vehicle;
    determining whether the level of driving autonomy of the vehicle is below a threshold level;
    adjusting the audio and/or video setting of the media content item in response to determining that the level of driving autonomy of the vehicle is below the threshold level; and
    maintaining the audio and/or video setting of the media content item in response to determining that the level of driving autonomy of the vehicle is at or above the threshold level.

4. The method according to claim 3, wherein determining the threshold level of driving autonomy of the vehicle comprises:
    determining an environmental condition at a location.

5. The method according to claim 3, further comprising:
    determining the threshold level of driving autonomy of the vehicle, wherein the threshold level is based at least in part on
    determining the cognitive load of the driver of the vehicle.

6. The method according to claim 1, further comprising:
  determining whether the media content item is viewable by the driver of the vehicle;
  adjusting the audio and/or video setting of the media content item in response to the media content item being viewable by the driver of the vehicle; and
  maintaining the audio and/or video setting of the media content item in response to the media content item not being viewable by the driver of the vehicle.

7. The method according to claim 1, wherein adjusting the audio and/or video setting of the media content item comprises,
  reorientating a screen of the vehicle.

8. The method according to claim 1, wherein adjusting the audio and/or video setting of the media content item comprises:
  transferring display of the media content item from a screen of the vehicle to a screen of a mobile device.

9. The method according to claim 1, wherein adjusting the audio and/or video setting of the media content item comprises:
  requesting an audio component relating to the media content item based at least in part on the level of driving autonomy of the vehicle; and
  generating for audio playback the audio component to the driver of the vehicle.

10. The method according to claim 1, wherein the media content item is displayed on a multiple view directional display configured to display multiple images with each image being visible in a specific direction, and adjusting the audio and/or video setting of the media content item comprises:
  adjusting an input to the multiple view directional display to change the display of at least one of the multiple images.

11. A system comprising control circuitry configured to:
  determine if a vehicle is operating in an autonomous driving mode associated with a level of driving autonomy of the vehicle;
  based at least in part on determining that the vehicle is operating in an autonomous driving mode, monitor, using one or more sensors of the vehicle, a level of distraction associated with a driver of the vehicle;
  based at least in part on monitoring the level of distraction associated with the driver of the vehicle, determine a cognitive load of the driver of the vehicle, wherein the cognitive load of the driver of the vehicle is based at least in part on a plurality of environmental conditions requiring either a higher or a lower level of attention of the driver of the vehicle;
  detect an increase in the cognitive load of the driver of the vehicle;
  based at least in part on detecting the increase in the cognitive load of the driver of the vehicle, determine a higher level of driving autonomy of the vehicle; and
  based at least in part on determining the higher level of driving autonomy of the vehicle:
    determine whether a media content item is being consumed in the vehicle; and
    automatically adjust an audio and/or video setting of the media content item based at least in part on the increase in the cognitive load of the driver of the vehicle.

12. The system according to claim 11, wherein the control circuitry is further configured to:
  determine a location of the vehicle, wherein the level of driving autonomy of the vehicle is a level implemented at the location.

13. The system according to claim 11, wherein the control circuitry is further configured to:
  determine the level of driving autonomy of the vehicle;
  determine whether the level of driving autonomy of the vehicle is below a threshold level; or
  adjust the audio and/or video setting of the media content item in response to determining that the level of driving autonomy of the vehicle is below the threshold level; and
  maintain the audio and/or video setting of the media content item in response to determining that the level of driving autonomy of the vehicle is at or above the threshold level.

14. The system according to claim 13, wherein, when determining the threshold level of driving autonomy of the vehicle, the control circuitry is configured to:
  determine an environmental condition at a location.

15. The system according to claim 13, wherein the control circuitry is further configured to determine the threshold level of driving autonomy of the vehicle, and wherein determining the threshold level is based at least in part on determining
  the cognitive load of the driver of the vehicle.

16. The system according to claim 11, wherein the control circuitry is further configured to:
  determine whether the media content item is viewable by the driver of the vehicle;
  adjust the audio and/or video setting of the media content item in response to the media content item being viewable by the driver of the vehicle; and
  maintain the audio and/or video setting of the media content item in response to the media content item not being viewable by the driver of the vehicle.

17. The system according to claim 11, wherein, when adjusting the audio and/or video setting of the media content item, the control circuitry is configured to:
  reorientate a screen of the vehicle.

18. The system according to claim 11, wherein, when adjusting the audio and/or video setting of the media content item, the control circuitry is configured to:
  transfer display of the media content item from a screen of the vehicle to a screen of a mobile device.

19. The system according to claim 11, wherein, when adjusting the audio and/or video setting of the media content item, the control circuitry is configured to:
  request an audio component relating to the media content item based at least in part on the level of driving autonomy of the vehicle; and
  generate for audio playback the audio component to the driver of the vehicle.

20. The system according to claim 11, wherein the media content item is displayed on a multiple view directional display configured to display multiple images with each image being visible in a specific direction, and, when adjusting the audio and/or video setting of the media content item, the control circuitry is configured to:
  adjust an input to the multiple view directional display to change the display of at least one of the multiple images.

\* \* \* \* \*